United States Patent
Sohmshetty et al.

(10) Patent No.: US 12,233,541 B2
(45) Date of Patent: Feb. 25, 2025

(54) AUTONOMOUS MODULAR ROBOTS AND METHODS OF USE

(71) Applicant: Ford Global Technologies, LLC, Dearborn, MI (US)

(72) Inventors: Raj Sohmshetty, Canton, MI (US); Yifan Chen, Ann Arbor, MI (US); Kurt Lundeen, Novi, MI (US); Sanghyun Hong, Ann Arbor, MI (US); Smruti Panigrahi, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 623 days.

(21) Appl. No.: 17/540,997

(22) Filed: Dec. 2, 2021

(65) Prior Publication Data

US 2023/0173694 A1    Jun. 8, 2023

(51) Int. Cl.
  *B25J 18/02*   (2006.01)
  *B25J 9/00*    (2006.01)
  (Continued)

(52) U.S. Cl.
  CPC .......... *B25J 18/025* (2013.01); *B25J 9/0009* (2013.01); *B25J 9/1679* (2013.01); *B25J 11/008* (2013.01); *B25J 5/007* (2013.01); *B25J 9/08* (2013.01)

(58) Field of Classification Search
  CPC ... B25J 5/007; B25J 9/0009; B25J 9/08; B25J 9/1679; B25J 11/008; B25J 18/025
  See application file for complete search history.

(56) References Cited

U.S. PATENT DOCUMENTS 3,790,011 A * 2/1974 Owen, Jr. ............... B65F 3/041
                                                      414/608
5,769,596 A * 6/1998 Burton ................... E02F 3/3659
                                                       37/468
(Continued)

FOREIGN PATENT DOCUMENTS

KR           101272008 B1    5/2013

OTHER PUBLICATIONS

Igus® Robot Control Software: programme and control robots, Programming—simulation—control: igus® Robot Control, IGUS Plastics for longer life—brochure.
(Continued)

*Primary Examiner* — Saul Rodriguez
*Assistant Examiner* — Brendan P Tighe
(74) *Attorney, Agent, or Firm* — Emily Drake; Eversheds Sutherland (US) LLP

(57) ABSTRACT

Autonomous modular robots and methods of use are disclosed herein. An example system includes a first assembly includes a first controller having a first processor that causes a first assembly support to translate along a first axis and align with a container placed on the first assembly support which is connected to a third assembly. The third assembly is configured to release a lid when the container has been engaged with the lid. The lid and container form a second assembly that includes a second processor and a second sensor assembly located in the lid. A transfer assembly can transfer an object into and out of the container. The first processor can determine a position and orientation of a delivery platform, planned movement and position of the second assembly, and planned operations of the transfer assembly in order to deliver a package to the delivery platform.

18 Claims, 5 Drawing Sheets

(51) Int. Cl.
    *B25J 9/16*          (2006.01)
    *B25J 11/00*        (2006.01)
    *B25J 5/00*          (2006.01)
    *B25J 9/08*          (2006.01)

(56) References Cited

U.S. PATENT DOCUMENTS

| | | |
|---|---|---|
| 10,035,667 B2 | 7/2018 | Criswell et al. |
| 2019/0384315 A1 | 12/2019 | Ratanaphanyaratl et al. |
| 2023/0415331 A1* | 12/2023 | Larsson .................. B25J 5/007 |

OTHER PUBLICATIONS

Honeywell International Inc., Honeywell announces fully automated robotic unloader for distribution centers, Fort Mill, S.C., Apr. 5, 2012.

\* cited by examiner

AUTONOMOUS MODULAR ROBOTS AND METHODS OF USE

BACKGROUND

Autonomous modular robots (AMR) can be used to last mile delivery. In fact, AMR-based delivery for last mile is being rapidly adopted around world. To effectively transport containers/packages autonomously, two distinct functions can be implemented: (1) autonomous navigation to reach the destination; and (2) autonomous loading and unloading of the packages. Load and unload functionality is an important feature. If a human is required to load and unload package, certain problems may occur. For example, pickup and delivery can only be done when a human user is present. The robot may need to wait a long time for the user to show up to load packages. Also, robot-to-robot transfer of packages cannot be utilized.

BRIEF DESCRIPTION OF THE DRAWINGS

A detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
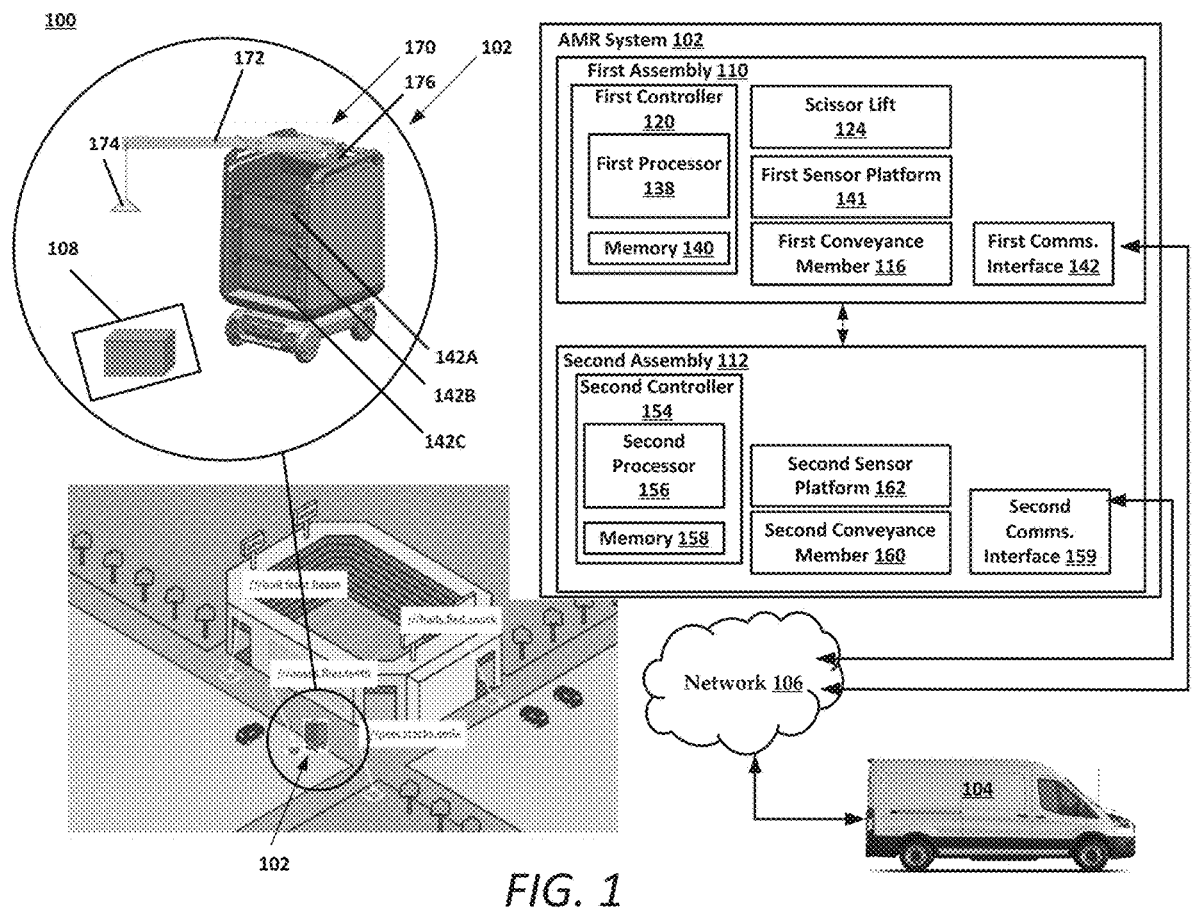
FIG. 1 illustrates an example architecture where the systems and method of the present disclosure may be practiced, including one example AMR.

The present disclosure pertains to autonomous modular robots that can be used to delivery packages efficiently, for example, in last mile delivery scenarios. In one configuration, an example AMR may have a first assembly or base platform, and a second assembly or top hat comprising a container system and a transfer system. The AMR can comprise an optimal distribution of computational systems, sensors, and energy sources between the two assemblies. The computational systems can coordinate sensing, decision making, and actuation during loading and unloading of containers or packages. The AMR can also enable transportation/loading/unloading of reusable containers, as well as recyclable boxes.

An example first assembly or base platform of the robot can include autonomous locomotion functions, a central computer system for command and control, sensors for perception, autonomous navigation, and connectivity to a network. The second assembly can be mounted to the first assembly, and may include an independent energy source and one or more smart containers. The second assembly can accommodate containers of varying size. The second assembly can include content sensors (e.g., load, temperature, and others), and include external sensors (camera, Lidar, or etc.).

A transfer system or assembly may be enabled for unloading/loading of packages. The transfer system may be mounted on container system or directly on the mobile platform. The transfer system may include electrical and communicative connections to first assembly and/or the second assembly. The transfer system could include a telescoping boom mounted on top of the container system. The boom can include a pulley mechanism with a suction cup or some other gripping end effector. The gripper can be lowered to pick up a package. The boom can telescope outward or inward to drop off the package on the curb or into the container. To unload a package, the container opens to allow the transfer system to pick up the package and drop off at the target location.

The top hat modules can be added or removed from the base platform. The joint elements between the base platform and the top hat modules provides mechanical, electrical, & communication connectivity. AMR Modules are not swappable. Top hat modules may be transferrable from one base platform to another base platform or a base platform to a fixed platform or a fixed platform to a base platform. The connectors are appropriately weather resistant. the connectors will incorporate a load sensor or a strain gauge, or something similar, to make each joint serve as a force/torque sensor. Connection system enables the following actions: rough alignment features, fine positioning mechanism, retention mechanism, electrical power transfer, electrical data transfer, and ingress protection. The top hat takes advantage of higher visibility to create surroundings/environment information (steps, obstacles, etc.) with sensors on both top hat and base. The top hat also controls package transfer boom (telescoping, gripping, etc.). The top hat also manages package unload mechanism once base sends unloading request. The base manages motion to navigate to the target location using GPS. The base also determines motion commands that can ensure package safety based on data from top hat (CG location, contents in package bin, etc.). The base also communicates with top hat modules to unload packages.

Illustrative Embodiments

Turning now to the drawings, FIG. 1 depicts an illustrative architecture 100 in which techniques and structures of the present disclosure may be implemented. The architecture 100 includes an AMR system (hereinafter "AMR 102"), a delivery vehicle 104, and a network 106.

Some or all of these components in the architecture 100 can communicate with one another using the network 106. The network 106 can include combinations of networks that enable the components in the architecture 100 to communicate with one another. The network 106 may include any one or a combination of multiple different types of networks, such as cellular, cable, the Internet, wireless networks, and other private and/or public networks. The network can include both short and long-range wireless networks.

The AMR 102 can be configured to deliver packages to a target location, such as a drop zone 108 near a stadium. It will be understood that the AMR 102 can be configured to autonomously deliver objects such as packages to any target location. In some instances, the AMR 102 acts as a last-mile delivery apparatus, transporting packages from a delivery vehicle to the target location, where the delivery vehicle 104 is located at a specified distance away from the target location. In one example, the AMR 102 can be dropped off by the delivery vehicle 104 to make one or more last mile deliveries around a target location.

Figure 2:
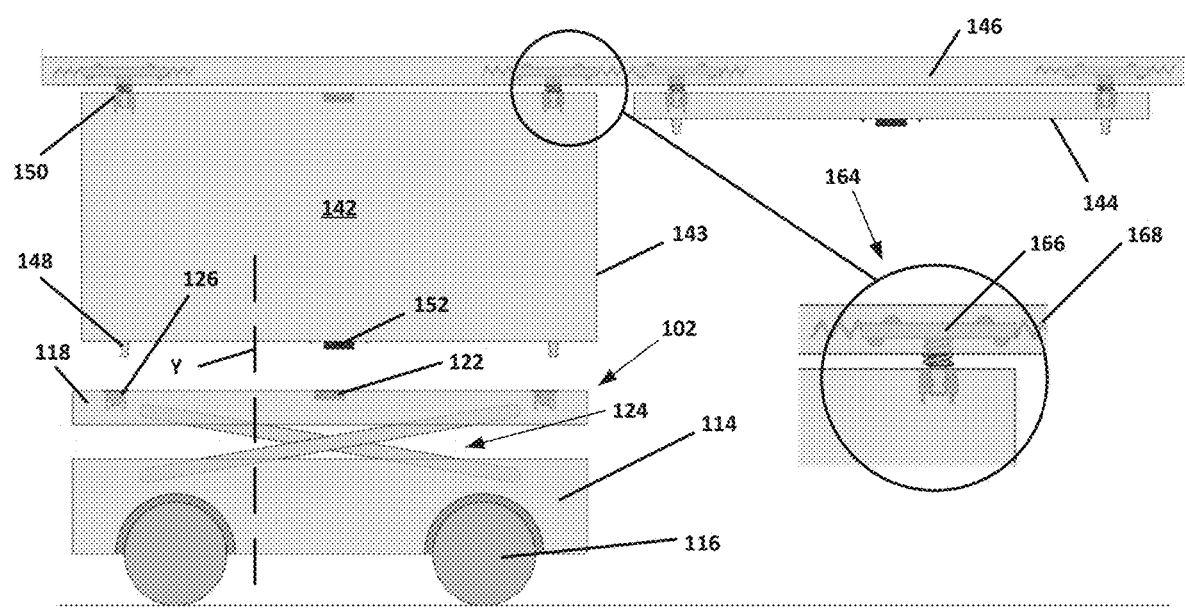
FIG. 2 illustrates an example architecture where the systems and method of the present disclosure may be practiced, including another example AMR.

Referring now to FIG. 2, the AMR 102 can comprise a first assembly 110 and a second assembly 112. The first and second assemblies are modular, with the first assembly acting as a base or mobile platform. The second assembly 112 is configured to stack on top of the first assembly 110, and may be referred to as a top hat. The first assembly 110 can dock with, support, and transport any number of different top hats.

The first assembly 110 can comprise a frame 114 and a first conveyance member 116. The frame 114 can take any shape, but in some instances is rectangular in shape. The frame 114 can be enclosed with panels to house various components as will be discussed herein. The first conveyance member 116 can include wheels that can be rotated by a drive mechanism (not shown), which could include electric motors or fuel powered engine.

The first assembly 110 can also comprise a first assembly support 118 and a first controller 120. The first assembly support 118 can include a platform that is sized to support the second assembly 112. The first assembly support 118 can include a first portion 122 of an electrical and communication interface (a second portion of the electrical and communication interface is associated with the second assembly 112 as discussed infra).

The first assembly 110 can also include a scissor lift mechanism 124 that can be used to translate the first assembly support 118 (and the second assembly when present) along a first axis Y. The scissor lift mechanism 124 can be activated to raise or lower the first assembly support 118 to engage with the second assembly 112 and also to align the second assembly 112 with a platform or delivery area, as will be discussed in greater detail below.

Figures 3, 4:
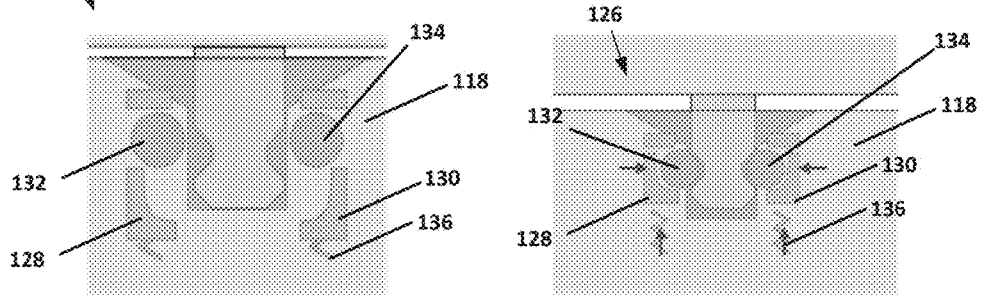
FIGS. 3 and 4 collectively illustrate the operation of example securement assemblies used to connect modules of an AMR.

Referring briefly to FIGS. 3 and 4, the first assembly support 118 can also include a first securement assembly 126 that can include two spring loaded mechanisms. The first securement assembly 126 can comprise brackets 128 and 130 that are each driven by a spring, such as 136. When the spring 136 is compressed, the brackets 128 and 130 upwardly drive two detents 132 and 134, respectively, into a groove fabricated into a tubular protrusion. The groove and protrusion are part of a second securement assembly associated with the second assembly 112 that will be discussed below with reference to the second assembly 112. In general, the first securement assembly 126 is located on a lower edge or surface of the first assembly support 118, while the second assembly 112 sits on a top edge or surface of the first assembly support 118.

Referring back to FIGS. 1 and 2, the first assembly 110 can comprise a first controller 120 that can include a first processor 138 and memory 140. The first processor 138 executes instructions stored in memory 140 to perform the functions and methods attributed to the first assembly 110 as disclosed herein. When referring to actions performed by the first assembly 110, the first controller 120, and/or the first processor 138, this includes the execution of instructions by the first processor 138. A first communications interface 143 can be used by the first processor 138 to transmit and/or receive data over the network 106. Although not shown, the first assembly 110 can include its own dedicated power source to operate the electrical components of the first assembly 110. This power source can be shared with the electrical components of the second assembly 112 as well.

In some instances, the first processor 138 can be configured to align the first assembly 110 with the second assembly 112, when the first assembly 110 is docking with the second assembly 112. The first processor 138 can be configured to receive information that is indicative of a current location of the first assembly and autonomously navigate the first assembly 110 to a target location in order to deliver a package.

The first processor 138 can be configured to utilize data or signals obtained from a first sensor platform 141 to aid in autonomous navigation and/or environment analyses. The first sensor platform 141 can comprise any combination of sensors such as cameras, infrared sensors, light ranging and detection (LIDAR), ultrasonic, radar, and the like. These sensors can be employed to gather data and generate signals that can be used by the first processor 138 to accurately and autonomously navigate around obstacles, as well as locate visual landmarks and/or artifacts in order to effectively deliver packages to target locations. In some instances, the first processor 138 can implement pose estimation logic to identify human beings from camera imaging. The first processor 138 can also use data and signals obtained by sensors placed into the second assembly 112. These sensors are discussed in greater detail below relative to the discussion of the second assembly 112.

The second assembly 112 can comprise a container 142 having a first or top end and a second or lower end. The container 142 can also have a door 143. The door 143 can be manually or automatically opened by a controller. The container 142 can be oriented such that when the door 143 is opened, the contents in the container 142 can slide out of the container to be picked up by a transfer assembly, which will be described herein.

The first or top end of the container 142 can be open and may be covered by a lid 144. The lid 144 is illustrated in combination with a third assembly 146, which in this example is a delivery platform that can be located in the back of the delivery vehicle 104 or other similar location, such as a warehouse or distribution facility. The container 142 may comprise a single compartment, however it will be understood that the container 142 may have a plurality of distinct compartments for holding different objects. The example AMR 102 in FIG. 1 is illustrated as comprising a plurality of distinct compartments. 142A, 142B, and 142C.

The second assembly 112 can comprise a second securement assembly 148 and a third securement assembly 150. The second securement assembly 148 is associated with the second or lower end of the container 142, while the third securement assembly 150 is associated with the first or upper end of the container 142. The second securement assembly 148 includes a tubular protrusion having a groove or other annular feature incorporated therein. The tubular protrusion receives the detents 132 and 134 of the first securement assembly 148, which locks the first assembly 110 to the second assembly 112. The third securement assembly 150 comprises two spring-loaded mechanisms which are identical to the spring-loaded mechanisms of the first securement assembly 126. The third securement assembly 150 can couple with the lid 144 or a fourth securement assembly associated with the third assembly 146.

The second or lower end of the container 142 also includes a second portion 152 of an electrical and communication interface (the first portion of the electrical and communication interface being associated with the first assembly 110 as discussed supra). When the first assembly 110 and the second assembly are joined together, the first portion 122 and the second portion 152 of the electrical and communication interface couple together, providing a pathway for the exchange of power and/or data between the first assembly 110 and the second assembly 112. The electrical and communication interface can be a waterproof or water-resistant coupling. Additionally, in some instances, the electrical and communication interface can incorporate a load sensor or strain gauge that allows the electrical and communication interface function as a force/torque sensor to detect container and/or object weight.

Referring to FIGS. 1-4, the second assembly 110 can comprise a second controller 154 that can include a second processor 156 and memory 158. The second processor 156 executes instructions stored in memory 158 to perform the functions and methods attributed to the second assembly 112 as disclosed herein. When referring to actions performed by the second assembly 112, the second controller 154, and/or the second processor 156, this includes the execution of instructions by the second processor 156. A second communications interface 159 can be used by the second processor 156 to transmit and/or receive data over the network 106. Although not shown, the second assembly 112 can include its own dedicated power source to operate the electrical components of the second assembly 112.

The second processor 156 can be configured to receive information that is indicative of a current location of the second assembly 112 and autonomously navigate the second assembly 112 to a target location in order to deliver a package. Of course, this navigation occurs when the second assembly 112 is detached from the first assembly 110. For example, when the second assembly 112 has been detached from the first assembly 110, the second processor 156 can operate a second conveyance member 160. In some instances, the second conveyance member 160 includes wheels that are coupled to the container 142 in such a way that the wheels can extend from underneath a lower end of the container 142. When the second assembly 112 is joined to the first assembly 110, the wheels can be retracted, allowing the second assembly 112 to sit flush against the first assembly support 118. When detached, the second processor 156 can cause the wheels to extend, which raises the lower end of the container 142 off of the first assembly support 118.

The second processor 138 can also be configured to utilize data or signals obtained from a second sensor platform 162 to aid in autonomous navigation and/or environment analyses. The second sensor platform 162 can comprise any combination of sensors such as cameras, infrared sensors, light ranging and detection (LIDAR), ultrasonic, radar, and the like. These sensors can be employed to gather data and generate signals that can be used by the second processor 156 to accurately and autonomously navigate around obstacles, as well as locate visual landmarks and/or artifacts in order to effectively deliver packages to target locations. In some instances, the second processor 156 can implement pose estimation logic to identify human beings from camera imaging. Also, due to the relative height differences between the second assembly 112 and the first assembly 110 (when stacked), the second assembly 112 may have a higher vantage point for cameras or other sensors of the second sensor platform 162. In some instances, data from the first sensor platform 141 can be combined with data from the second sensor platform 162.

The second sensor platform 162 can also include sensors that can detect attributes of objects in the container 142. For example, the second sensor platform 162 can include a load sensor that determines a weight of an object in the container 142. A temperature probe can be included to determines a temperature within in the container 142, which may be advantageous in instances where the object being transported is temperature sensitive. Also, the second sensor platform 162 may comprise a center of gravity sensor that detects a current location of the center of gravity of the AMR 102. When certain objects are placed into the container 142, they may create weight imbalances that may cause the AMR 102 to be off-balance and even tip over. Monitoring the current center of gravity allows the first and/or second controllers to determine undesirable or off-balance loading of the second assembly 112. When undesirable loading is detected, the AMR 102 may use a transfer assembly to reorient contents or remove contents to remedy the undesirable loading. An example transfer assembly is disclosed in greater detail infra.

In one example, the second processor 156 and second sensor platform 162 and power source can be incorporated into the container 142, which results in the creation of a smart container. In another example, the second processor 156 and second sensor platform 162 (and power source) can be incorporated into the lid 144, creating a smart lid, which can be coupled to a standard container. The container can be reused by placing a new smart lid on the container.

In some instances, the second assembly 112 can include another half of an electrical and communication interface. The other half of the electrical and communication interface is provided on the lid 144.

The third assembly 146 can comprise one or more horizontally aligned securement assemblies, such as a fourth securement assembly 164. The third assembly 146 can include a plurality of fourth securement assemblies, some of which can support the container 142 and some that support the lid 144.

The fourth securement assembly 164 includes a tubular protrusion having an annular groove, which are identical to components of the first securement assembly 126. However, the fourth securement assembly 164 includes a planar body 166, which can be tensioned and held in place with lateral springs, such as lateral spring 168. The lateral springs allow the planar body 166 to shift laterally and vertically to allow mating between the fourth securement assembly 164 and the third securement assembly 150 of the second assembly 112. When the fourth securement assembly 164 and the third securement assembly 150 are engaged, the container 142 of the second assembly 112 can hang from the third assembly 146. In some instances, the fourth securement assembly 164 can be mounted on a track or grid (not shown) that can allow the container 142 to be repositioned.

Referring back to FIG. 1, the AMR 102 can comprise a transfer assembly 170. The transfer assembly 170 can comprise a boom arm 172 and receiver 174. In one example, the transfer assembly 170 can be mounted to the container 142 of the second assembly 112. The transfer assembly 170 can be modularized such that the components used to operate the boom arm 172 and receiver 174 are enclosed in a housing 176. The transfer assembly 170 can be attached and detached from the second assembly 112 using a shared electrical and communication interface as described above. In another example, the transfer assembly 170 can be mounted to the frame of the first assembly 110. The transfer assembly 170 can be operated by the first controller 120 of the first assembly 110 or by the second controller 154 of the second assembly 112. In yet other instances, the transfer assembly 170 can include its own dedicated computing and control elements, such as when the has been modularized. Thus, the transfer assembly 170 can be electrically and communicatively coupled to either the first controller 120 or the second controller 154.

The boom arm 172 can be configured to rotate, pivot, and extend/retract. The receiver 174 can include a suction cup, claw, magnet, or any other mechanism that allows a package or the container 142 to be picked up and moved. For example, a package or the container 142 can be offloaded from the AMR 102 to a delivery location using the transfer assembly 170. For example, a package or the container 142 can be loaded onto the AMR 102 from a pickup location using the transfer assembly 170. As noted above, the transfer assembly 170 can be used to adjust the location of a package or container when an undesirable loading condition is present, such as when a center of gravity of the AMR 102 may cause a tip over event. For example, if a heavy object is placed into an upper container, this may cause a tip over hazard. The transfer assembly 170 can be used to transfer the heavy object to a lower container to adjust the center of gravity. Again, the sensors configured to determine center of gravity values may be placed into the second sensor platform of the second assembly 112.

Referring now to FIGS. 5A-5F (also with reference to certain elements of FIG. 1), which illustrate an example sequence where the first assembly 110 can be used to pick up the second assembly 112 from the third assembly 146 and deliver the second assembly 112 to a fourth assembly at a target delivery location. Intermediately, the second assembly 112 is constructed by obtaining both the container 142 and the lid 144 from the third assembly 146 in two separate actions.

Initially, the first assembly 110 can be autonomously navigated to a general location where the container 142 is associated with the third assembly 146. The first controller 120 can utilize GPS signals to determine a navigation path to the third assembly 146. When the first assembly 110 arrives, the first controller 120 can perform a rough or gross alignment with the container 142 using data or signals from the first sensor platform 141. For example, the first controller 120 can use image recognition or other similar data to align with the container 142. When roughly aligned, the first controller 120 can cause the first assembly support 118 to move upwardly to engage with the container 142. As clearance between the first assembly support 118 and the container 142 decreases, the first controller 120 can refine the alignment between the first assembly support 118 and the container 142 by moving the first assembly 110 using the first conveyance member 116. When the first securement assembly 126 aligns with the second securement assembly 148 and the first assembly support 118 is moved upwardly. The first securement assembly 126 engages with the second securement assembly 148 and the two halves of the electrical and communication interface mate with one another (first portion 122 and second portion 152 mate). In more detail, when the first assembly support 118 pushes up on the container 142, the spring 131 of the first securement assembly 126 is moved, along with the brackets 128 and 130 (as illustrated in FIGS. 3 and 4). This movement causes the detents 132 and 134 to move into the groove in the tubular protrusion of the second securement assembly 148, locking the container 142 to the first assembly support 118. Correspondingly, the upward movement of the first assembly support 118 and container 142 causes the third securement assembly 150 to disengage from the fourth securement assembly 164 of the third assembly 146. The process for disengagement of the third securement assembly 150 and the fourth securement assembly 164, which causes the container 142 to unlock from the third assembly 146, is the reverse of the process for causing the first securement assembly 126 to engage with the second securement assembly 148 and lock the container 142 to the first assembly support 118.

After the first assembly 110 docks with and removes the second assembly 112, the AMR 102 can navigate to a location where the lid 144 is associated with another securement assembly of the third assembly 146. This additional securement assembly is identical to the fourth securement assembly 164, but instead is used to securely suspend the lid 144. The first assembly 110 can, using the processes disclosed above, navigate to underneath the lid 144. The first assembly 110 can extend the first assembly support 118 and the container 142 upwardly until the third securement assembly 150 engages with a fifth securement assembly 180 of the lid 144. Indeed, the lid 144 can include both the fifth securement assembly 180 and a sixth securement assembly 182. The fifth securement assembly 180 is identical to the second securement assembly 148 of the second assembly 112 and the sixth securement assembly 182 is identical to the first securement assembly 126 of the first assembly 110.

Figure 5A:
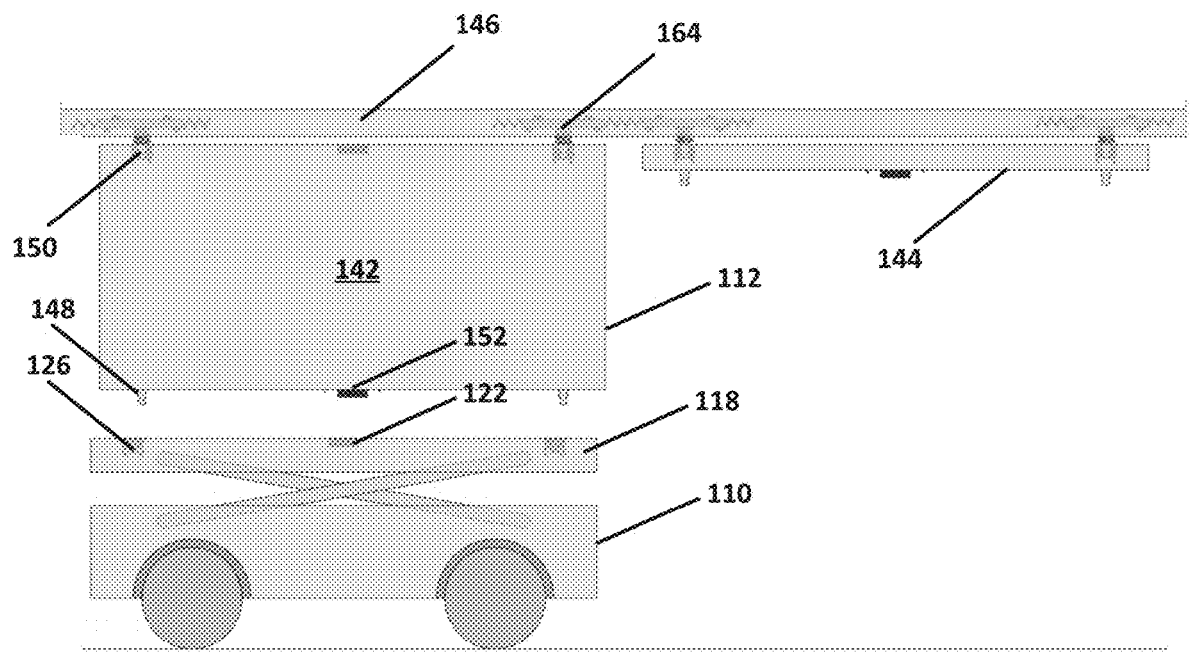
FIGS. 5A-5F collectively illustrate an example sequence of operations where an AMR is build in a modular fashion and delivers a container to a delivery platform.
Figure 5B:
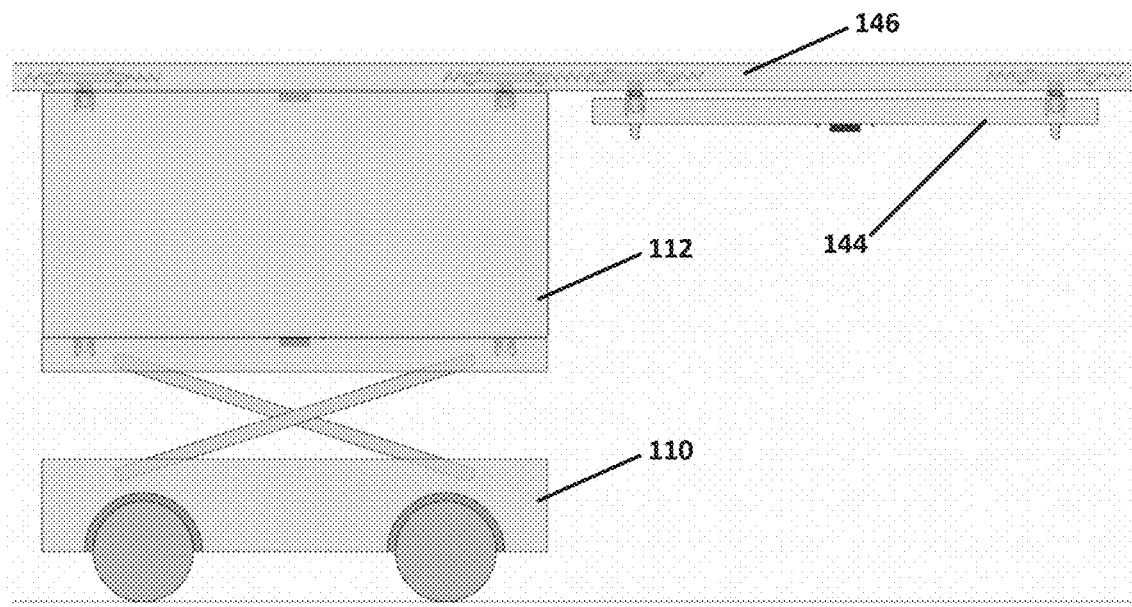
Figure 5C:
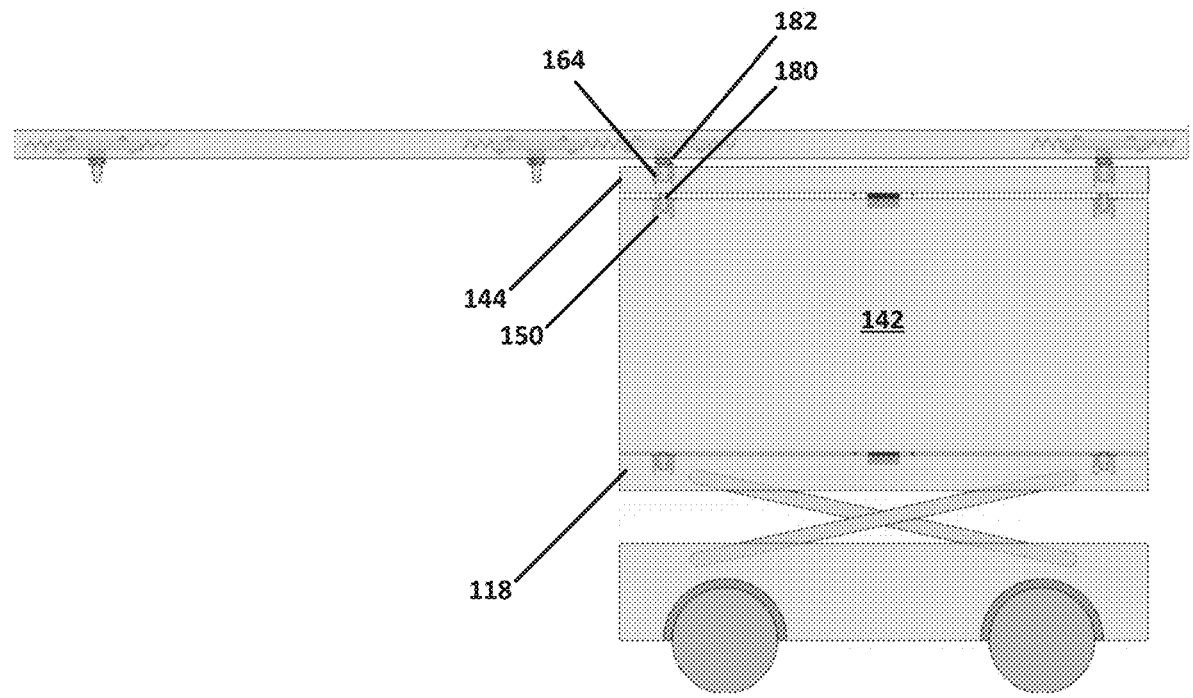
Figure 5D:
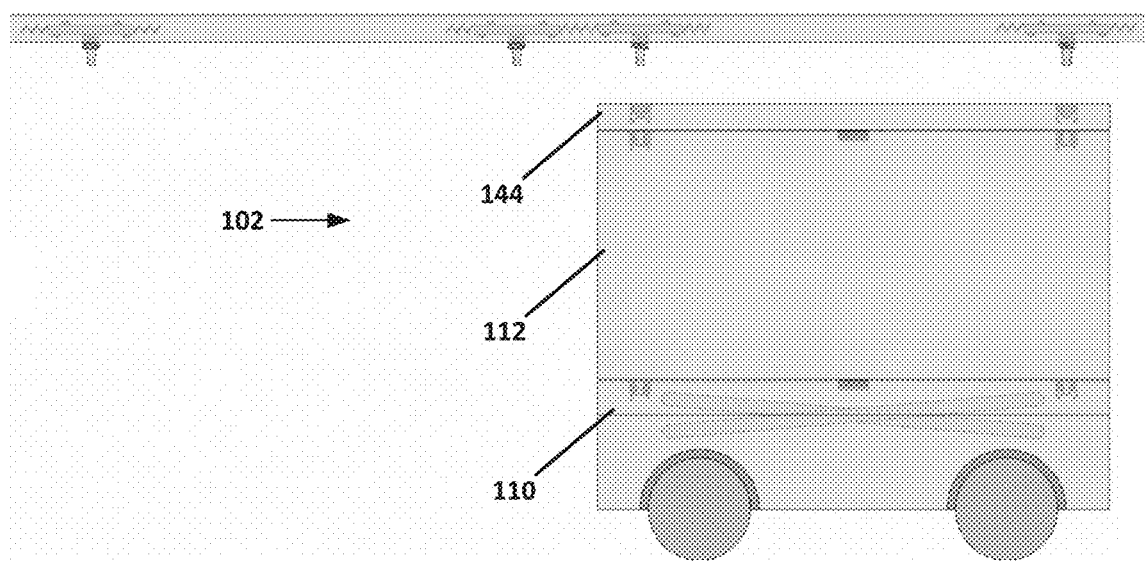
Figure 5E:
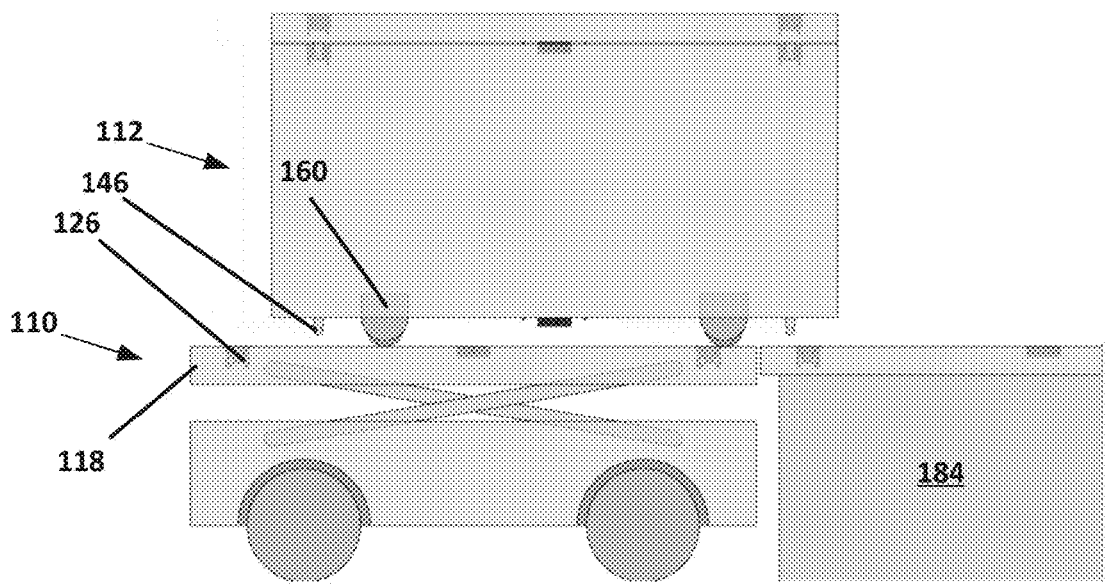
Figure 5F:
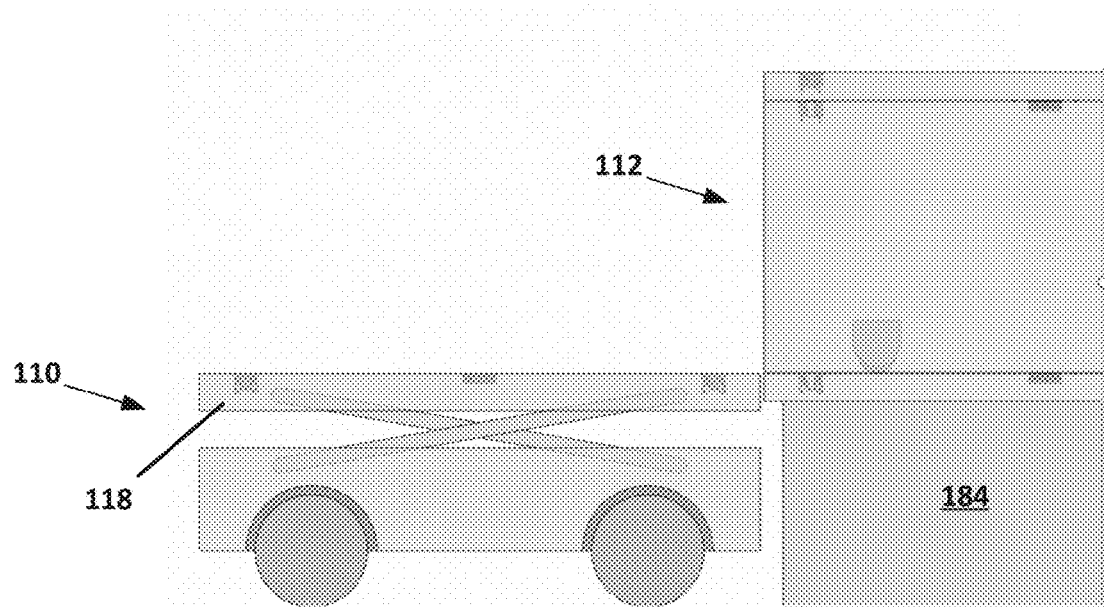

The upward movement causes the lid 144 to detach from the fourth securement assembly 164, allowing the AMR 102 to move away from the third assembly 146. The resulting AMR 102 is a combination of the first assembly 110, the second assembly 112, and the lid 144. The AMR 102 can automatically navigate to a delivery location. In one example use case, the AMR 102 can navigate to a fourth assembly 184 as illustrated in FIGS. 5E and 5F. The fourth assembly 184 can include a delivery pedestal, but could also include a different mobile platform. For example, a first mobile platform (first assembly) may pass the second assembly 112 off to a second mobile platform. This may occur if the range of the first mobile platform is low. For example, the power source of the first mobile platform may have an insufficient state of charge. In another example, the first mobile platform may be damaged.

When the AMR 102 arrives at the fourth assembly 184, the first controller 120 may utilize sensor data from both the first sensor platform 141 and/or the second sensor platform 162 to cause the first assembly support 118 to align horizontally with an upper surface of the fourth assembly 184. When aligned, the second controller 154 can cause the second conveyance member 160 to extend, which causes the first securement assembly 126 and the second securement assembly 148 to disassociate. The second controller 154 can utilize signals from the second sensor platform 162 to navigate the second assembly off of the first assembly support 118 onto the upper surface of the fourth assembly 184. In some instances, the second securement assembly 148 can dock with a seventh securement assembly 186, which is identical in type to the first securement assembly 126.

Referring back to FIG. 1, the AMR 102 can be used to deliver a package to a drop zone 108. In one example, the target drop off location can be provided to the AMR 102 over the network 106 using What3Words or a similar addressing system. The AMR 102 approaches the target location using GPS signals. The first controller of the first assembly can receive the following information: (a) a precise target location and its surroundings information (steps, obstacles, and so forth) from the second sensor platform (camera and sensors) of the second assembly. Package weight, shape, and size can be determined from sensors in the container of the second assembly. Container system information (such as center of gravity location, contents in each bin can also be determined. The first controller interprets the location information and prepares a plan for package drop off. The plan can include delivery platform position and orientation, planned movement and position of the second assembly, and planned operations of the transfer system. AMR executes the plan and drops off the package at the target location. The AMR can perform a similar operation for package pick up.

Implementations of the systems, apparatuses, devices and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general-purpose computer, special purpose computer, or special purpose processing device to perform a certain function or group of functions. An implementation of the devices, systems and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims may not necessarily be limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A system, comprising:
a first assembly comprising (i) a frame, (ii) a first conveyance member allowing the first assembly to translate, the first conveyance member being associated with the frame, (iii) a first sensor platform, (iv) a first assembly support that can be translated along a first axis (v) and a first controller comprising a processor that executes instructions stored in memory to:
provide autonomous navigation of the first assembly by controlling the first conveyance member in response to signals from the first sensor platform; and
cause the first assembly support to translate, allowing a second assembly placed on the first assembly support to be selectively positioned along the first axis;
the second assembly comprising (i) a container that receives an object, (ii) a second sensor platform, and (iii) a second controller comprising a second processor that executes instructions stored in memory to obtain signals from the second sensor platform that can be utilizes by the first controller;
a first securement assembly associated with the first assembly support;
a second securement assembly associated with a second end of the second assembly; and
a third securement assembly associated with a first end of the second assembly,
wherein the second controller is configured to cause a second conveyance member of the second assembly to extend when the second securement assembly has detached from the first securement assembly.

2. The system according to claim 1, further comprising a scissor lift mechanism coupling the first assembly support to the frame.

3. The system according to claim 1, wherein the third securement assembly can securely and releaseably engage with a third assembly that is configured to support the second assembly before the second assembly is attached to the first assembly, the third assembly comprising a fourth securement assembly that can engage with the third securement assembly and release the second assembly when the second assembly is attached to the first assembly.

4. The system according to claim 1, wherein the second controller is configured to:
receive signals from the second sensor platform;
cause the second assembly to autonomously navigate to a fourth assembly based on the signals from the second sensor platform, the fourth assembly comprising a fifth securement assembly; and
cause the second securement assembly to align with the fifth securement assembly.

5. The system according to claim 4, wherein the first controller is configured to cause the first assembly support to align the first assembly support with the fourth assembly, and permit the second assembly to translate from the first assembly support to a fifth assembly.

6. The system according to claim 5, wherein the second controller is included in a lid that is configured to electrically and communicatively associate with the first end of the second assembly.

7. The system according to claim 6, wherein the first controller is configured to align the second assembly with the lid, the lid comprising a sixth securement assembly and a seventh securement assembly.

8. The system according to claim 7, wherein the seventh securement assembly is configured to engage with the second securement assembly of the second assembly and the sixth securement assembly engages with a fourth securement assembly of a third assembly.

9. A system comprising:
a first assembly comprising a first controller having a first processor that is configured to execute instructions stored in memory to cause a first assembly support to translate along a first axis; and align with a container to be placed on the first assembly support which is connected to a third assembly;
the third assembly configured to release a lid when the container has been engaged with the lid, the lid and the container forming a second assembly, the second assembly comprising a second processor and a second sensor assembly located in the lid; and a transfer assembly for transferring an object into and out of the container;

wherein the first processor is configured to determine a position and orientation of a delivery platform, planned movement and position of the second assembly to the delivery platform, and planned operations of the transfer assembly in order to deliver a package from the container to the delivery platform, wherein the transfer assembly comprises a boom arm and receiver, the transfer assembly being mounted to either the first assembly or the second assembly, wherein the transfer assembly is controllable to pick up the object for placement into the container and transfer of the object from the container to a target location, and wherein the boom arm is configured to telescope in and out.

10. The system according to claim 9, wherein the first assembly comprises a first securement assembly, the second assembly comprises a second securement assembly and a third securement assembly, and the third assembly comprises a fourth securement assembly.

11. The system according to claim 10, wherein the second processor causes the second securement assembly to engage or disengage with the fourth securement assembly, and causes the second securement assembly to engage or disengage with a seventh securement assembly of the lid.

12. The system according to claim 9, wherein the first processor is configured to autonomously navigate the first assembly with the second assembly attached, using signals from a first sensor platform.

13. The system according to claim 9, further comprising a scissor lift mechanism coupling the first assembly support to a frame of the first assembly.

14. A system, comprising:

a first assembly comprising (i) a frame, (ii) a first conveyance member allowing the first assembly to translate, the first conveyance member being associated with the frame, (iii) a first sensor platform, (iv) a first assembly support that can be translated along a first axis (v) and a first controller comprising a processor that executes instructions stored in memory to:

provide autonomous navigation of the first assembly by controlling the first conveyance member in response to signals from the first sensor platform; and cause the first assembly support to translate, allowing a second assembly placed on the first assembly support to be selectively positioned along the first axis;

the second assembly comprising (i) a container that receives an object, (ii) a second sensor platform, and (iii) a second controller comprising a second processor that executes instructions stored in memory to obtain signals from the second sensor platform that can be utilizes by the first controller;

a first securement assembly associated with the first assembly support;

a second securement assembly associated with a second end of the second assembly; and a third securement assembly associated with a first end of the second assembly, wherein the second controller is configured to:

receive signals from the second sensor platform;

cause the second assembly to autonomously navigate to a fourth assembly based on the signals from the second sensor platform, the fourth assembly comprising a fifth securement assembly; and cause the second securement assembly to align with the fifth securement assembly.

15. The system according to claim 14, wherein the first controller is configured to cause the first assembly support to align the first assembly support with the fourth assembly, and permit the second assembly to translate from the first assembly support to a fifth assembly.

16. The system according to claim 15, wherein the second controller is included in a lid that is configured to electrically and communicatively associate with the first end of the second assembly.

17. The system according to claim 16, wherein the first controller is configured to align the second assembly with the lid, the lid comprising a sixth securement assembly and a seventh securement assembly.

18. The system according to claim 17, wherein the seventh securement assembly is configured to engage with the second securement assembly of the second assembly and the sixth securement assembly engages with a fourth securement assembly of a third assembly.

* * * * *